United States Patent Office
3,462,649
Patented Aug. 19, 1969

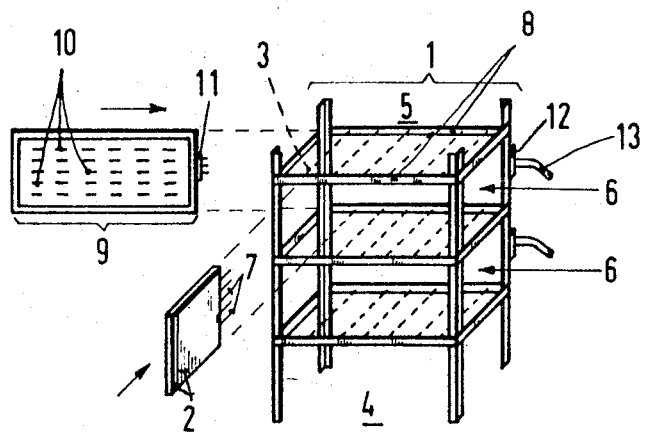
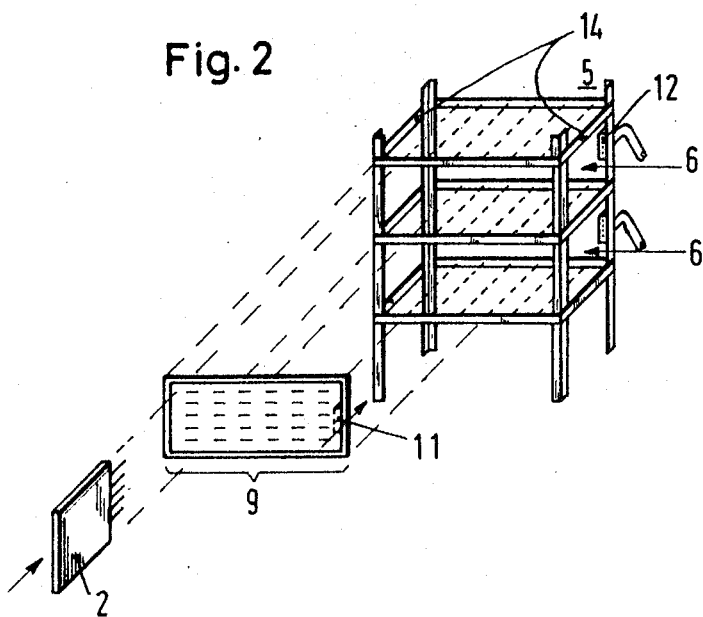

3,462,649
FRAMEWORK WIRING ARRANGEMENT FOR COMPONENT MODULES INSERTABLE INTO THE FRAMEWORK
Johannes Stich, Munich, Germany, assignor to Siemens Aktiengesellschaft, Munich, Germany, a corporation of Germany
Filed Oct. 21, 1965, Ser. No. 499,192
Claims priority, application Germany, Feb. 17, 1965, S 95,495
Int. Cl. H02b 1/04
U.S. Cl. 317—101                                5 Claims

ABSTRACT OF THE DISCLOSURE

Disclosed herein is a wiring arrangement for framework wiring of the type employed in telephone exchange cabinets. A plurality of component-carrying modules are operable to be inserted into the framework from the front to the rear thereof and have contact pins operable to mate with wiring panels disposed along the rear of the framework. The wiring panels are operable to interconnect a plurality of horizontally-spaced modules. In order that the wiring panels may be freely accessible for removal and insertion, vertically-spaced, horizontally-extending guide rails are provided either extending along the direction of insertion, or along the rear of the framework, to receive the wiring panels.

---

The invention concerns framework wiring for electrically interconnecting flat component-carrying modules insertable into the framework of a framework assembly for long-distance communication installations, and in particular for telephone exchanges. The framework wiring of the invention includes wiring panels which are positioned at the rear of a framework, each panel including a plurality of spring contact strips for contact strips for contacting a plurality of component-carrying modules, which strips are interconnected by wiring for electrically interconnecting the modules.

An object of the invention is to simplify the installation of framework assemblies of this type, and particularly to facilitate the electrical interconnection of flat component-carrying modules inserted into frameworks in instances where the framework assemblies are to be installed in back-to-back or back-to-wall relationship.

There are known framework assemblies, the rear walls of which comprise individual vertical panels, including spring contact strips interconnected by wiring, for the reception of "plug-in" units, which panels are affixed to the rear of the frameworks at the installation site. The spring contact strips of such panels are electrically connected to framework-mounted receptacles, to which are also connected the system cables of the installation. However, the rear of such frameworks must be accessible during installation as a pre-requisite to the mounting of these wiring panels. Only after the wiring panels have been affixed to the frameworks can such framework assemblies be placed in back-to-back or back-to-wall relationship. Also, a framework assembly so positioned must be moved from its installation position whenever the replacement of a wiring panel or the addition of a new panel becomes necessary. Furthermore, since the wiring panels extend vertically the entire height of the framework, it is necessary to arrange the inserted modules relating to a given functional group, which modules are interconnected by a particular one of the wiring panels, one above the other vertically, instead of inserting them into the framework in a horizontal row. As far as servicing is concerned the horizontal arrangement is more favorable than a vertical arrangement.

According to the invention, these disadvantages are eliminated due to the fact that the framework wiring of the invention includes wiring panels constructed as flat units which are horizontally insertable into a framework. The panels are inserted into the framework between guide rails which are affixed to the framework in such a manner that the panels are insertable in the direction of the insertion of the flat component-carrying modules, or alternatively, perpendicularly to such direction, into the plane of the framework assembly rear wall. In addition to the advantage that the wiring panels comprise horizontally insertable units similar to the component-carrying modules, the particular construction of the wiring panels and cooperating framework guide rails of the invention makes possible the rapid installation of several framework assemblies in back-to-back or back-to-wall relationship. The wiring panels are inserted into the frameworks as prefabricated units at the installation site after the frameworks have been placed in the installation position, and individual panels may be removed from a framework assembly, as required, without the necessity of moving the assembly from the installation position.

The construction of the wiring panels of the invention, in the form of insertable flat units, also makes possible the utilization of "mat" or harness wiring, well known in the manufacture of flat-component-carrying circuit boards, and which provides a simple and inexpensive method for manufacturing the wiring panels of the invention. The term "mat" wiring refers to a network of pre-shaped wires, configured for mounting onto a particular component-carrying circuit board, and may include spaced wire guides for securing the network to the board.

Such a "hardness" of wire is particularly suitable for mounting onto the wiring panel of the invention, due to the fact that the panel comprises a flat carrying frame to which are attached the spring contact strips that receive the plug pins of the component-carrying modules. The contact strips are positioned parallel to one another within the carrying frame, with the wire attachment lugs of the strips extending from the rear side of the panel in spaced parallel rows. Attached to the carrying frame between each of the contact strips are parallel rows of wire guides for securing the network of pre-shaped wires to the panel. Each of the individual wires of the network is placed in a pre-determined wire guide, and is positioned thereby for connection to the appropriate contact strip attachment lug.

According to one embodiment of a framework assembly incorporating the framework wiring of the invention, the individual wiring panels are horizontally inserted from the side of the framework into guide rails positioned in the plane of the framework assembly rear wall. The component-carrying modules for a particular functional group, corresponding to an individual wiring panel, are then inserted from the front of the framework, and the plug pins attached thereto are received through outlets in the front of the wiring panel by the spring contact strips attached to the panel carrying frame. In this fashion, the component-carrying modules are arranged in several horizontal rows within the framework, each row comprising a separate functional group corresponding to an individual wiring panel, and the units of each functional group can be removed from the framework, as required without disturbing the units of any other group.

In accordance with another framework assembly embodiment, the wiring panels and component-carrying modules both are inserted into the framework from the front thereof. In this embodiment, the guide rails for receiving the wiring panels extend horizontally from the front to the rear of the framework, for guiding the wiring panels into position into the panel of the framework assembly rear wall. As in the previously described embodiment, the plug pins of the component-carrying modules are then received by the contact strips of the panels, to complete the circuit arrangements of the various individual functional groups. This modification facilitates the integration of the framework assembly components in instances where the framework assemblies are inaccessible from the rear and sides.

A further advantage of constructing the wiring panels in the form of insertable flat units is that electrical connection between the wiring panels and the system cables can be effectuated in the same simple manner as is utilized for electrically connecting the component-carrying modules to the wiring panels. This is achieved by connecting the wiring panels to the system cables by means of receptacle units affixed to the framework, and into which are received plugs attached to the wiring panels. The system cables may be connected to the receptacle units on the framework by soldered connection, or by removable plug elements, in which case the receptacle units will be double plug-receiving elements.

The invention will now be more fully described in conjunction with the operative embodiments thereof shown in the accompanying drawings.

In the drawings:

FIG. 1 is a diagrammatic perspective view of the invention showing the relationship of the framework assembly components in position for integration;

FIG. 2 is a diagrammatic perspective view similar to FIG. 1, showing a modified integration relationship of the framework assembly components;

Figures 3, 4:
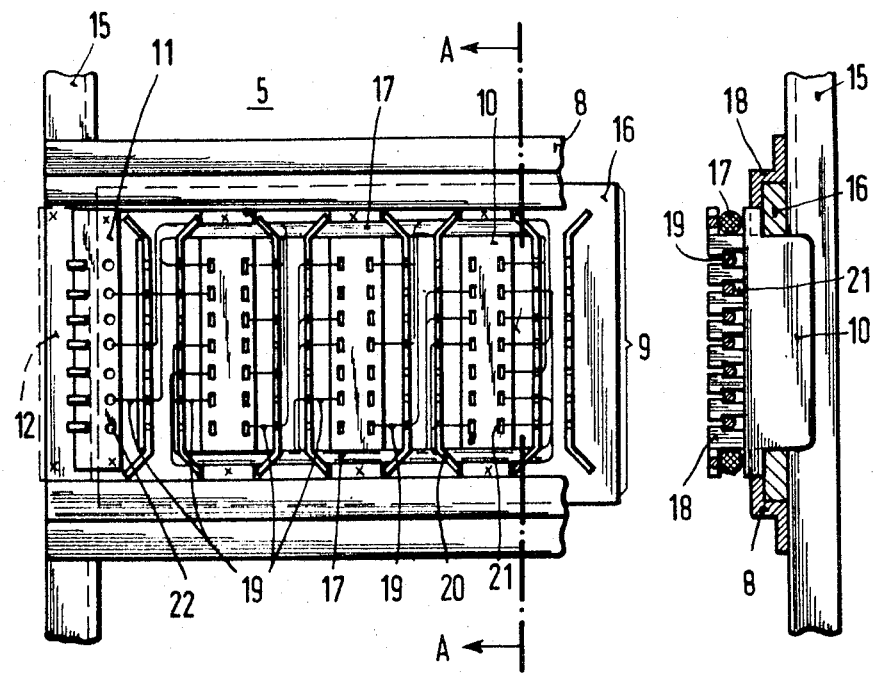
FIG. 3 is a rear view of the wiring panel of the invention in position in a framework; and, FIG. 4 is a sectional view taken on line A—A of FIG. 3.

With reference to the drawings, in FIG. 1 are shown the components of a framework assembly, including a framework 1 which may be open, as here illustrated for clarity, or which may be enclosed by a cabinet. Framework 1 is constructed to receive several insertable flat component-carrying modules 2, of which only one is shown. Support rails 3, indicated in phantom lines, receive and support the flat component-carrying modules 2, which are inserted from the insertion, or front, side 4 of framework 1 toward the framework rear side 5. Modules 2, here schematically indicated as flat, "plug-in," component-carrying circuit boards, are positioned in framework 1 with the flat planar surface of the modules oriented substantially vertically. A plurality of the modules 2 are placed side-by-side horizontally, with the module planar surfaces parallel, to form a horizontal row 6 of the modules within framework 1. The horizontal rows 6 are arranged vertically, one above the other, the number of such rows 6 within a particular framework 1 being dependent upon the individual requirements of the system. Plug pin contacts 7 are attached to each module 2 and are electrically connected to the components mounted on the circuit board of the module.

Horizontal guide rails 8 are vertically spaced along the framework front side 4 and rear side 5. The guide rails delineate the upper and lower edges of each horizontal row 6. Guide rails 8 along the framework rear side 5 also form a means for receiving wiring panels 9, which are constructed as insertable flat units and to which are attached spring contact strips 10, which, in the drawings, are indicated by the outlet openings for plug pins 7. In this embodiment, the guide rails 8 along the framework rear side 5 are cross-sectionally configured in the manner illustrated in FIG. 4, to facilitate the reception of wiring panels 9. The guide rails 8 along the framework front side 4 may be of a simpler configuration, as desired in accordance with the economics of manufacturing.

The spring contact strips 10 are wired together in a manner described in more detail hereinafter in connection with FIGS. 3 and 4, and are electrically connected to a plug 11. A receptacle unit 12, affixed to framework 1, receives and engages plug 11 concomitantly upon the insertion of wiring panel 9 into the framework rear side 5. Receptacle unit 12 is connected to a system cable 13 by soldered connection, or by a plug attached to cable 13 (not shown), in which case receptacle unit 12 comprises a double plug-receiving element. If more than one row 6 of component-carrying modules 2 relate to a single functional group, a single wiring panel 9 may be constructed which extends vertically across all of the rows 6 of such group.

In FIG. 2 are shown the components of a framework assembly having a slightly modified integration relationship. The components include a framework 1 and a component-carrying module 2 in position to be inserted into the framework, as in the FIG. 1 embodiment. However, for receiving wiring panel 9, guide rails 14 are provided which delineate the upper and lower edges of each horizontal row 6. Guide rails 14 extend horizontally in the direction of insertion of the flat component-carrying modules 2, toward the framework rear side 5, so that wiring panel 9 may be inserted from the insertion, or front, side 4 of framework 1 into the plane of the framework assembly rear wall. In this embodiment, plug 11 and receptacle unit 12 are arranged so that when wiring panel 9 is inserted into framework 1, the plug 11 will be received and engaged by receptacle unit 12.

For installations which require the framework assemblies to be arranged with their rear walls adjacent one another, or adjacent a wall, but where the assemblies are accessible from the sides thereof, guide rails 8 of the embodiment shown in FIG. 1 are utilized for guiding and supporting the wiring panels 9. However, if the assemblies are inaccessible from the sides as well as from the rear, the guide rails 14 of the FIG. 2 embodiment are utilized.

FIGS. 3 and 4 show a wiring panel 9 between the guide rails 8, of the FIG. 1 embodiment, in position in the framework rear side 5. Only one of the framework vertical supports 15 adjacent the framework rear side 5 is illustrated in the drawing. Wiring panel 9 comprises a carrying frame 16 to which are attached the spring contact strips 10. Plug 11 is affixed to carrying frame 16, and when the wiring panel has been fully inserted into the framework, the plug is received and engaged by receptacle unit 12, shown in phantom lines, affixed to framework support 15.

On the rear side of carrying frame 16 is mounted a network 17 comprising a plurality of loose, individual wires. The rear side of carrying frame 16 is that side which is opposite to the side in which the plug pins 7 of modules 2 are received by contact strips 10, as indicated diagrammatically in FIG. 1. Individual wires of network 17 are secured to carrying frame 16 by wire guides 18, and the composite group of these individual wires routed along the periphery of the carrying frame are secured by large wire guides 20. The wires are shaped, preferably by a machine, in accordance with the desired circuit plan of the network.

One of the terminal sections 19 of each of the individual wires extends from one of the large peripheral wire guides 20, to an individual wire guide 18 adjacent an attachment lug 21 of a contact strip 10. These terminal sections 19 are then cut to the appropriate length for connection to the individual preselected attachment lugs 21. Network 17 and wire guides 18 and 20 may be prefabricated as a separate "mat" or harness wiring unit utilizing a support frame (not shown), for maintaining the wire guides in the proper spaced relationship during fabrication. This "mat" wiring is then positioned on carrying frame 16 so that the wire guides 18 are positioned between the parallel rows of attachment lugs 21. Terminal wire sections 19 are then in position to be connected, as by soldering, to the lugs 21.

The other terminal sections 19 of the individual wires comprising network 17 are connected, as by soldering, to terminals 22 of plug 11.

The utilization of "mat" wiring in the construction of wiring panel 9 is made possible by the use of the flat carrying frame 16 to which the "mat" wiring is attached. Wiring panels constructed as described hereinabove in the form of insertable flat units can very easily be inserted or removed from a framework 1 even though the rear wall of the framework assembly is inaccessible. Furthermore, in accordance with the embodiment shown in FIG. 2, a wiring panel can be inserted or removed from a framework even if the side and rear walls of the framework assembly are inaccessible. The wiring panel 9 is electrically connected to system cable 13 by means of the receptacle unit 12, and as hereinbefore described the cable 13 may be connected to receptacle unit 12 by soldered connection or by a plug element. If desired, additional plugs, such as plug 11, may be affixed to a wiring panel 9 for electrical connection to additional system cables or special cables as required.

It will be evident that many minor changes could be made in the apparatus specifically described herein without departing from the scope of the invention. Accordingly, the invention is not to be considered limited to such apparatus.

I claim:

1. In a framework assembly for interconnecting components mounted on separate modules insertable into the framework assembly from the front side thereof.

a framework having vertically-extending and horizontally-extending supports attached together to form an open frame for the components and for interconnections, said frame defining rear, front and side open panels for access to the component modules and the interconnections, vertically-spaced, horizontally extending guide rails fixed to said framework and extending along at least one of the rear panel and the side panels of the framework, support rails for guiding the modules into the frame from the front thereof to the rear, at least one wire panel having guide surfaces abutting and extending along said vertically-spaced guide rails, for movement along said rails into operative position, said wire panel having a carrying frame extending along the rear frame panel in its operative position and mounted thereon a plurality of laterally-spaced interconnected spring contact strips, each said component module having contacts at the rear thereof mounted to engage a spring contact strip on said wire panel as the module is guided into the frame, each said spring contact strip being aligned with a different said module and the interconnections between the strips being operable to interconnect the components on the different modules.

2. The apparatus of claim 1 wherein each of said contact strips has a plurality of wire attachment lugs affixed thereto, said attachment lugs being positioned at the rear side of the carrying frame, the interconnections between contact strips including a network of loose individual wires interconnecting said attachment lugs, and a plurality of wire guides for securing the individual wires of said network to said carrying frame mounted at the rear of said carrying frame between said contact strips, the terminal portion of each individual wire being positioned by one of said wire guides for connection to one of said attachment lugs.

3. A framework assembly as recited in claim 1 wherein said framework comprises means for receiving a plurality of said insertable modules in horizontal rows; and said guide rails are affixed to said framework substantially perpendicularly to the plane of the rear side thereof, the guide rails delineating the upper and lower edges of said rows and receiving one said wiring panel for each said horizontal row of insertable modules.

4. A framework assembly as recited in claim 1 wherein said framework comprises means for receiving a plurality of said insertable modules in horizontal rows; and said guide rails are affixed to the rear side of said framework substantially in the plane of said rear side, the guide rails delineating the upper and lower edges of said rows and receiving one said wiring panel for each said horizontal row of insertable modules.

5. A framework assembly as recited in claim 1 wherein said wiring panel further comprises a plug; and said framework assembly further comprises a receptacle unit affixed to said framework for engaging said plug, said receptacle unit also being connectable to an installation cable for electrically connecting the wiring panel to said installation cable.

References Cited

UNITED STATES PATENTS 3,014,160  12/1961  Brogden.
2,799,837  7/1957  Powell _____ 339—17

FOREIGN PATENTS 1,420,897  11/1965  France.
815,777  7/1959  Great Britain.

OTHER REFERENCES

Portenier et al.: Ger. App. No. 1,082,301, Publ., May, 1960.

Lohs et al.: Ger. App. No. 1,173,950, Publ., July, 1964.

ROBERT K. SCHAEFER, Primary Examiner

D. SMITH, Jr., Assistant Examiner

U.S. Cl. X. R.

312—223; 317—120, 122